(12) United States Patent
Benicewicz et al.

(10) Patent No.: US 9,109,070 B2
(45) Date of Patent: Aug. 18, 2015

(54) NANOPARTICLES WITH MULTIPLE ATTACHED POLYMER ASSEMBLIES AND USE THEREOF IN POLYMER COMPOSITES

(71) Applicants: Brian C. Benicewicz, Columbia, SC (US); Atri Rungta, Columbia, SC (US); Anand Viswanath, Columbia, SC (US); Linda S. Schadler Feist, Troy, NY (US); Douglas Dukes, Troy, NY (US)

(72) Inventors: Brian C. Benicewicz, Columbia, SC (US); Atri Rungta, Columbia, SC (US); Anand Viswanath, Columbia, SC (US); Linda S. Schadler Feist, Troy, NY (US); Douglas Dukes, Troy, NY (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 14/519,223

(22) Filed: Oct. 21, 2014

(65) Prior Publication Data
US 2015/0045516 A1 Feb. 12, 2015

Related U.S. Application Data

(62) Division of application No. 13/569,780, filed on Aug. 8, 2012, now Pat. No. 8,865,796.

(60) Provisional application No. 61/521,594, filed on Aug. 9, 2011.

(51) Int. Cl.
| | | |
|---|---|---|
| *C08F 212/08* | (2006.01) |
| *C08F 220/18* | (2006.01) |
| *C08F 285/00* | (2006.01) |
| *C08F 292/00* | (2006.01) |
| *B82Y 40/00* | (2011.01) |

(52) U.S. Cl.
CPC .............. *C08F 292/00* (2013.01); *C08F 285/00* (2013.01); *B82Y 40/00* (2013.01); *C08F 2438/01* (2013.01); *C08F 2438/03* (2013.01); *Y10S 977/788* (2013.01); *Y10S 977/882* (2013.01)

(58) Field of Classification Search
CPC ............... C08F 292/10; C08F 2438/01; C08F 2438/03; C08F 285/00; B82Y 40/00
USPC ........... 523/202, 200, 201; 526/201; 977/788, 977/882
See application file for complete search history.

(56) References Cited

U.S. PATENT DOCUMENTS 7,311,943 B2 * 12/2007 Jacobson et al. .............. 427/258
8,206,747 B2 * 6/2012 Zale et al. ..................... 424/489

* cited by examiner

*Primary Examiner* — Kelechi Egwim
(74) *Attorney, Agent, or Firm* — Dority & Manning, P.A.

(57) ABSTRACT

Methods of synthesizing a binary polymer functionalized nanoparticle are generally provided. In one embodiment, a first anchoring compound is attached to a nanoparticle, and a first plurality of first monomers are polymerized on the first anchoring compound to form a first polymeric chain covalently bonded to the nanoparticle via the first anchoring compound. In another embodiment, a first polymeric chain can be attached to the nanoparticle, where the first polymeric chain has been polymerized prior to attachment to the nanoparticle. Thereafter, a second anchoring compound is attached to the nanoparticle, and a second plurality of second monomers are polymerized on the second anchoring compound to form a second polymeric chain covalently bonded to the nanoparticle via the second anchoring compound. Nanoparticles are also generally provided having multiple polymeric assemblies.

16 Claims, 6 Drawing Sheets

NANOPARTICLES WITH MULTIPLE ATTACHED POLYMER ASSEMBLIES AND USE THEREOF IN POLYMER COMPOSITES

PRIORITY INFORMATION

The present application is a divisional of and claims priority to U.S. patent application Ser. No. 13/569,780 titled "Nanoparticles with Multiple Attached Polymer Assemblies and Use Thereof in Polymer Composites" of Benicewicz, et al. filed on Aug. 8, 2012, and claims priority to U.S. Provisional Patent Application Ser. No. 61/521,594 titled "Nanoparticles with Multiple Attached Polymer Assemblies and Use Thereof in Polymer Composites" of Benicewicz, et al. filed on Aug. 9, 2011; the disclosures of which are incorporated by reference herein.

BACKGROUND

Controlled radical polymerization has been widely used to synthesize different polymer architectures such as block copolymers, star polymers, gradient copolymers and polymer brushes. One of the interesting applications is the synthesis of polymer brushes on nanoparticles for incorporation into polymer nanocomposites. In polymer nanocomposite science, it has been well established in the recent years that chemical grafting of a homopolymer having the same chemistry as that of the polymer matrix onto the inorganic nanoparticle substrate shields the nanoparticle from the matrix. Theoretically this should prevent the matrix from de-wetting the substrate. However, in several instances there still remains an unfavorable entropic interaction between the grafted chains and the matrix, which causes the system to de-wet. This phenomenon is known as autophobic de-wetting and is described in detail by many researchers and is now well understood. Through simulation, Matsen et al. have demonstrated that the key to suppressing autophobic de-wetting lies at broadening the brush polymer/matrix polymer interface which can be achieved by using a bimodal system that contains a small number of long homopolymer chains in a brush which primarily consists of short dense brushes.

Although single component monodisperse polymer brushes have been successfully grafted from a variety of substrates including silica nanoparticles using a wide variety of techniques, there are surprisingly very few methods in the literature describing the synthesis of mixed polymer brush grafted surfaces. The first synthesis of mixed brushes was carried out independently by Minko et al.[4] and Dyer et al.[5] using the 'grafting from' approach based on surface anchored azo initiators. The synthesis of mixed brushes using controlled radical polymerization has been demonstrated by Zhao et al. who used a two-step ATRP and NMP reaction to graft PMMA and PS from a silica surface. However, these methods utilized a split anchoring agent (i.e., a "Y" anchoring agent with two functionalized groups extending therefrom). Then, each functionalized group can be used to attach a polymeric chain thereto.

As such, these methods are limited in the types of monomers required for separate polymerization. Additionally, these methods necessarily form a particle with a 50/50 percentage of each polymeric chain.

Thus, a need exists for improved methods for synthesizing nanoparticles with multiple polymer assemblies attached.

SUMMARY

Objects and advantages of the invention will be set forth in part in the following description, or may be obvious from the description, or may be learned through practice of the invention.

Methods are generally provided for synthesizing a binary polymer functionalized nanoparticle. In one embodiment, a first anchoring compound is attached to a nanoparticle, and a first plurality of first monomers are polymerized on the first anchoring compound to form a first polymeric chain covalently bonded to the nanoparticle via the first anchoring compound. In another embodiment, a first polymeric chain can be attached to the nanoparticle, where the first polymeric chain has been polymerized prior to attachment to the nanoparticle.

Thereafter, a second anchoring compound is attached to the nanoparticle, and a second plurality of second monomers are polymerized on the second anchoring compound to form a second polymeric chain covalently bonded to the nanoparticle via the second anchoring compound.

Nanoparticles are also generally provided having multiple polymeric assemblies. For example, a first polymeric chain can be covalently bonded to the surface of the nanoparticle; and a second polymeric chain covalently bonded to the surface of the nanoparticle.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION

Figure 1:
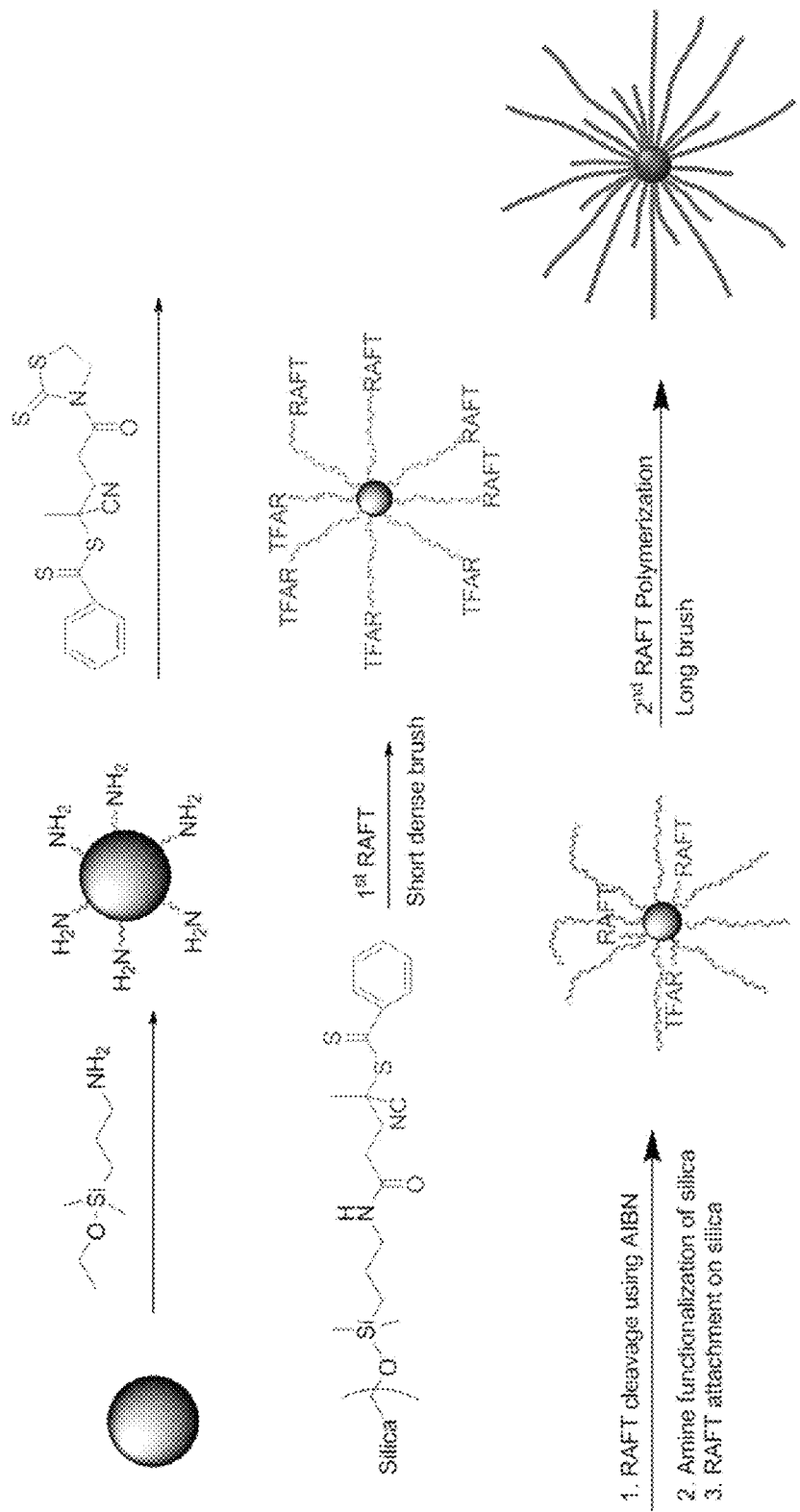
FIG. 1 shows a synthetic scheme describing the synthesis of binary brushes on silica nanoparticles using step-by-step RAFT polymerization according to one exemplary embodiment described in detail in the Examples.
Figure 2:
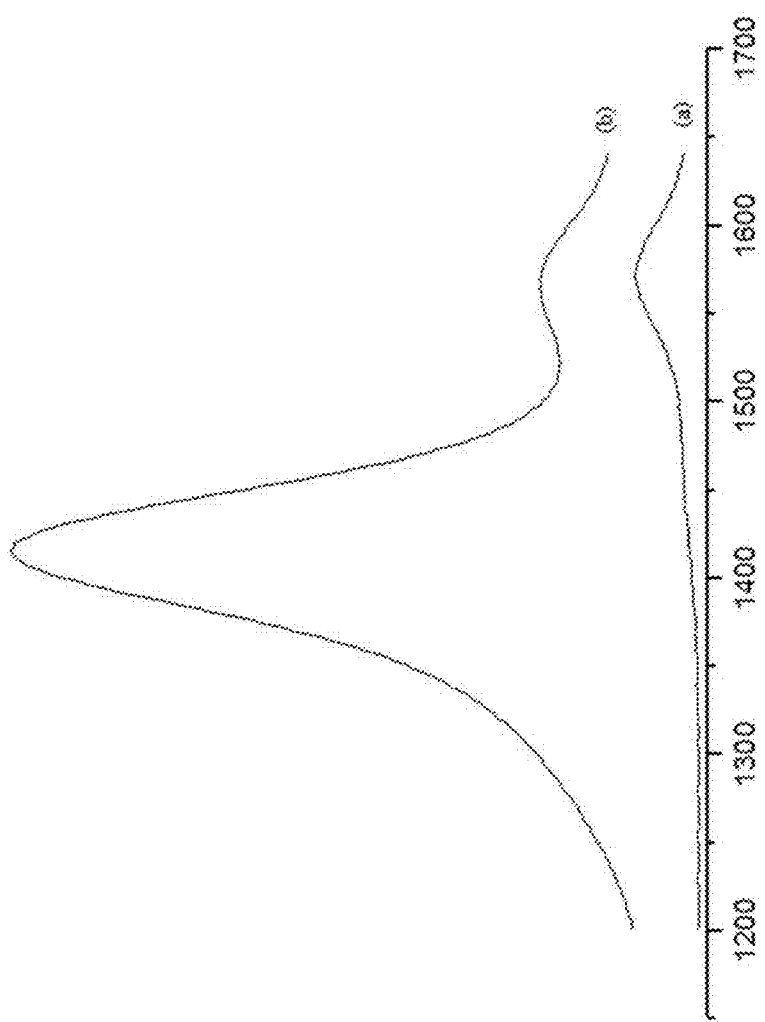
FIG. 2 shows an exemplary GPC trace of the bimodal distribution of polymer chains according to one example.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Versatile and widely applicable step-by-step methods are generally provided to synthesize nanoparticle with multiple polymeric assemblies through polymerization (e.g., RAFT polymerization). In one exemplary method, consecutive step-by-step polymerizations (e.g., utilizing RAFT polymerization) can be used to prepare nanoparticle with multiple polymeric assemblies. In another exemplary method, RAFT polymerization followed by ATRP polymerization can be used to synthesize nanoparticle with multiple polymeric assemblies.

Through these methods, nanoparticles can be functionalized with multiple polymeric assemblies. In particular each nanoparticle can have at least two different polymeric chains extending therefrom. In certain embodiments, the nanoparticle with multiple polymeric assemblies are formed while maintaining simultaneous control over multiple variables, including but not limited to monomer-type, grafted chain molecular weight, polydispersity, etc. The grafted polymer chains, which are covalently attached to the nanoparticle surface, can help improve the dispersion of the nanoparticles in an organic polymer matrix.

In one embodiment, two different types of polymeric assemblies (e.g., a first polymeric chain and a second polymeric chain) can be attached to the nanoparticle. In other embodiments, a third type of polymeric assembly (i.e., a third polymeric chain) can also be attached. Additional polymeric assemblies (e.g., a fourth polymeric chain) can also be attached to the surface, depending on the available surface area on the nanoparticle and/or the size, dispersity, and/or density of the first, second, and third polymeric chains already present on the surface of the nanoparticle.

Nanoparticles with multiple assemblies of polymer chains may be used in polymer nanocomposites, that is, mixtures of nanoparticles with one or more matrix polymers. Such composites may find use in composites with improved mechanical properties, optically clear composites with dispersed nanoparticles for applications such as high refractive index materials, enhance dielectric or conducting properties, or combinations of such properties, known as multifunctional materials. The nanoparticles may also have specific and targeted biological activity, such as antibacterial properties.

1. Nanoparticles:

The presently disclosed methods can be utilized on a variety of different types of nanoparticles. The nanoparticle may comprise, for example, natural or synthetic nanoclays (including those made from amorphous or structured clays), inorganic metal oxides (e.g., silica, alumina, and the like), nanolatexes, organic nanoparticles, etc. Particularly suitable nanoparticles include inorganic nanoparticles, such as silica, alumina, titania ($TiO_2$), indium tin oxide (ITO), CdSe, etc., or mixtures thereof. Suitable organic nanoparticles include polymer nanoparticles, carbon, graphite, graphene, carbon nanotubes, virus nanoparticles, etc., or mixtures thereof.

Nanoparticles as used herein means particles (including but not limited to rod-shaped particles, disc-shaped particles, platelet-shaped particles, tetrahedral-shaped particles), fibers, nanotubes, or any other materials having at least one dimension on the nano scale. In one embodiment, the nanoparticles have an average particle size of about 1 to about 1000 nanometers, preferably 2 to about 750 nanometers. That is, the nanoparticles have a dimension (e.g., a diameter or length) of about 1 to 1000 nm. Nanotubes can include structures up to 1 centimeter long, alternatively with a particle size from about 2 to about 50 nanometers. Due to their size, nanoparticles have very high surface-to-volume ratios.

The nanoparticles may be crystalline or amorphous. A single type of nanoparticle may be used, or mixtures of different types of nanoparticles may be used. If a mixture of nanoparticles is used they may be homogeneously or non-homogeneously distributed in the composite material or a system or composition containing the composite material. Non-limiting examples of suitable particle size distributions of nanoparticles are those within the range of about 2 nm to less than about 750 nm, alternatively from about 2 nm to less than about 200 nm, and alternatively from about 2 nm to less than about 150 nm.

It should also be understood that certain particle size distributions may be useful to provide certain benefits, and other ranges of particle size distributions may be useful to provide other benefits (for instance, color enhancement requires a different particle size range than the other properties). The average particle size of a batch of nanoparticles may differ from the particle size distribution of those nanoparticles. For example, a layered synthetic silicate can have an average particle size of about 25 nanometers while its particle size distribution can generally vary between about 10 nm to about 40 nm.

In one embodiment, the nanoparticles can be exfoliated from a starting material to form the nanoparticles. Such starting material may have an average size of up to about 50 microns (50,000 nanometers). In another embodiment, the nanoparticles can be grown to the desired average particle size.

2. Attaching a First Anchoring Compound to the Nanoparticle:

In certain embodiments, a first anchoring compound can be attached to the surface of the nanoparticle for subsequent attachment of the first polymeric chains (e.g., via a "grafting-from" or "grafting-to" approach, as described in greater detail below). The first anchoring compound is covalently bonded to the surface of the nanoparticle, either directly or via a first functionalization group. The particular anchor compound can be selected based upon the type of nanoparticle and/or the type of polymeric chain to be attached thereto.

The first anchoring compound has a functional group for further reaction. Suitable functional groups for further reaction can include, but are not limited to, amine groups (e.g., amide groups, azide groups, cyanate groups; nitrate groups, nitrite groups, etc.), thiol groups (e.g., sulfinic acid, sulfonic acid, thiocyanates, etc.), phosphonate groups, hydroxyl groups (e.g., —OH), carboxylic acid groups (e.g., —COOH), aldehyde groups (e.g., —CHO), halogen groups (e.g., haloalkanes, haloformyls, etc.), epoxy groups, alkenes, alkynes, and the like. For example, the anchoring compound can be a RAFT agent, when used with a RAFT polymerization technique.

Figure 3:
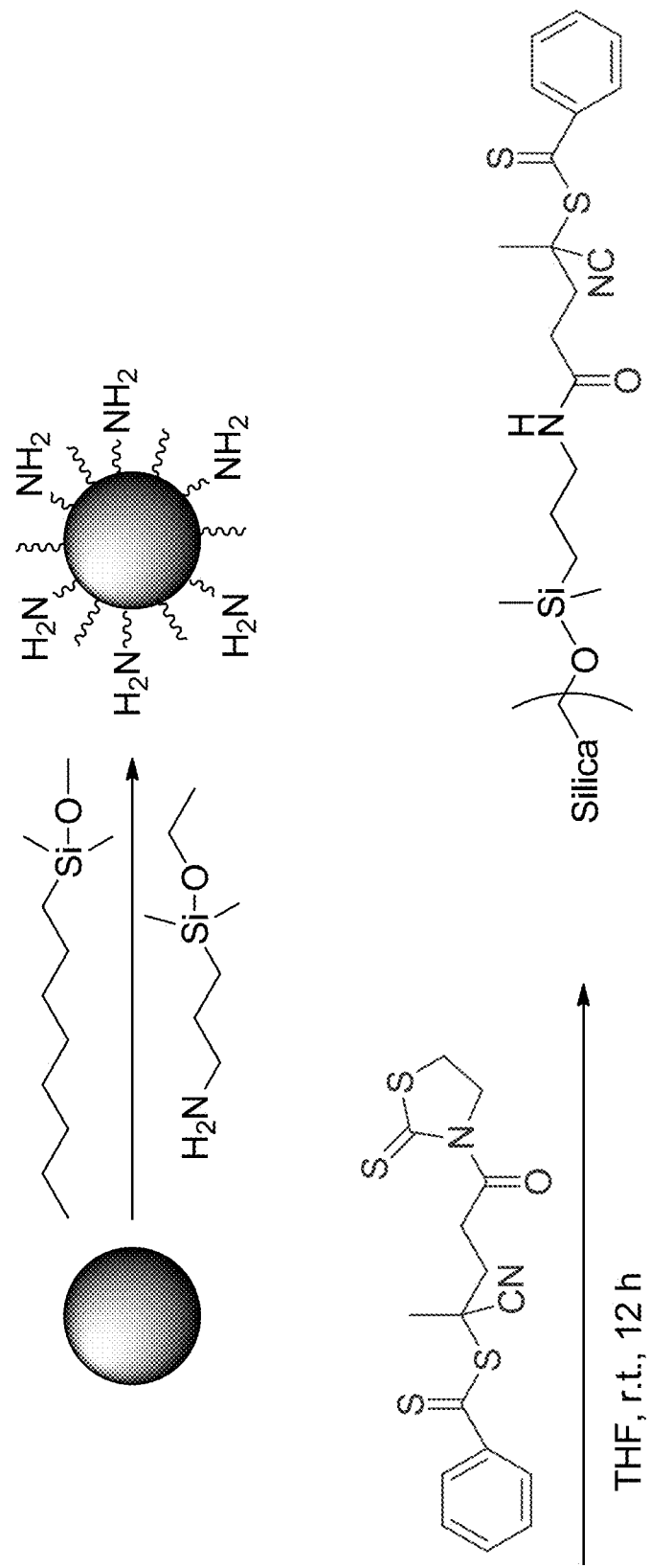
FIG. 3 shows a scheme for the immobilization of 4-cyanopentanoic acid dithiobenzoate (CPDB) as an exemplary first anchoring compound on the surface of a Si nanoparticle.
Figure 4:
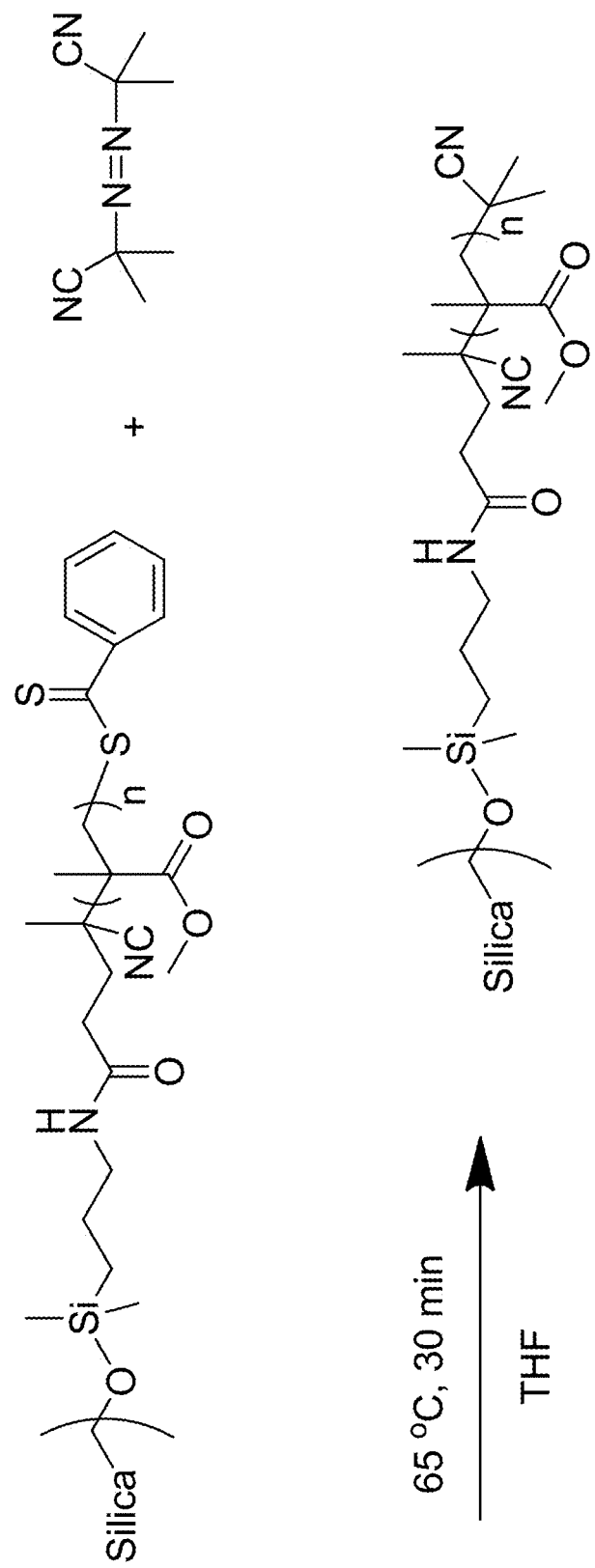
FIG. 4 shows a scheme for deactivation and cleavage of CPDB chain end form Si-g-PMMA$_1$ using AIBN as an exemplary first polymeric chain.
Figure 5:
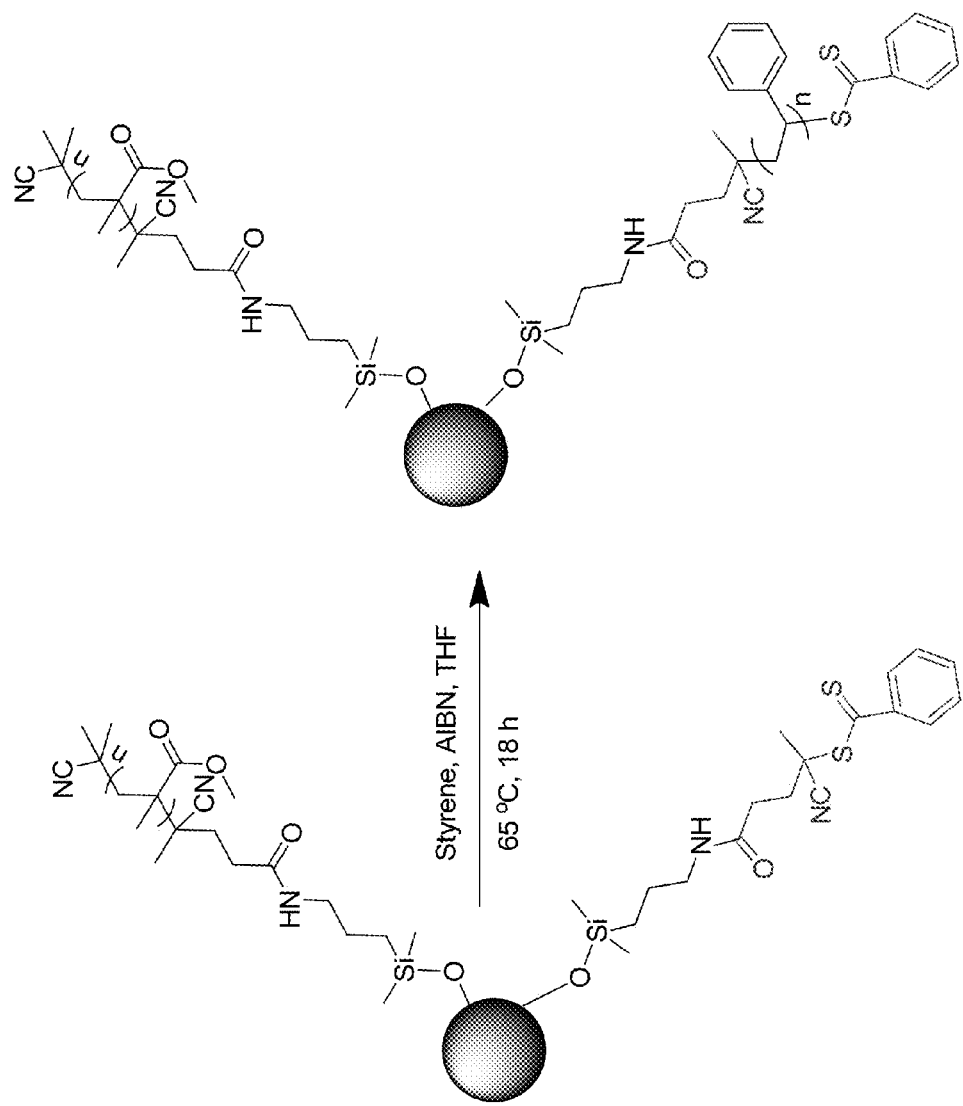
FIG. 5 shows a scheme for synthesis of PMMA and PS grafted colloidal silica nanoparticles as an exemplary first and second polymeric chain.
Figure 6:
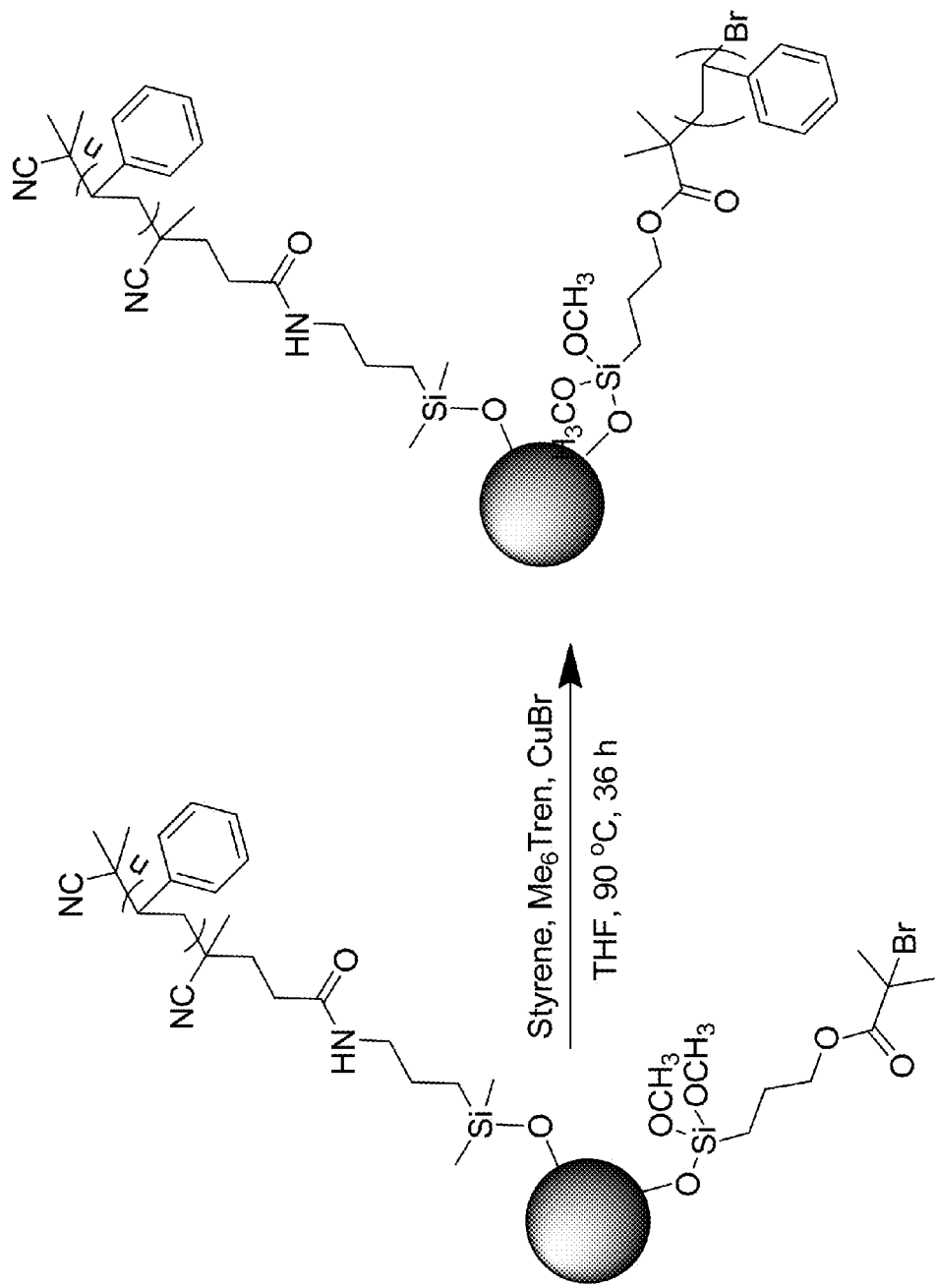
FIG. 6 shows a scheme for ATRP reaction from the surface of Si-g-PS to synthesize an exemplary second polymeric chain.

For example, in one particular embodiment, 4-cyanopentanoic acid dithiobenzoate (CPDB) can be attached to the surface of the nanoparticle as a first anchor, as shown in FIG. 3. In this embodiment, the dithioester anchoring compound can be immobilized onto the surface of the nanoparticles (e.g., colloidal silica nanoparticles). For instance, the 4-cyanopentanoic acid dithiobenzoate (CPDB) anchoring compound can be attached on the surface of the nanoparticles by first functionalizing the surface of the nanoparticles with amine groups using 3-aminopropyldimethylethoxysilane. Use of a mono-functional silane such as 3-aminopropyldimethylethoxysilane compared to a trifunctionl silane ensures the formation of a monolayer of initiator on the silica surface and prevents particle agglomeration by crosslinking during processing. The ratio of the 3-aminopropyldimethylethoxysilane to silica nanoparticles is critical in determining the grafting density. In addition to adjusting the ratio by varying the concentration of amino-silane, addition of a small amount of an inert dimethylmethoxy-n-octylsilane helps to partially cover the silica surface by inert alkyl groups and helps to tune the grafting density along with preventing aggregation of the nanoparticles. To attach the anchoring compound onto the amine functional silica, the 4-cyanopentanioc acid dithiobenzoate can be first activated by using 2-mercaptothiazoline. It can then immobilized onto the surface of silica via a condensation reaction with the amine groups on the silica surface. Using this approach, various CPDB-functionalized nanoparticles can be synthesized having a grafting density varying from 0.01-0.7 anchoring compounds/nm$^2$. An inherent advantage of this technique compared to the other "grafting-from" methods is the ease and accuracy in measuring the grafting density before carrying out the polymerization. The CPDB molecule is UV-VIS active and hence by comparing the absorption at 302 nm from the CPDB-functionalized nanoparticles to a standard absorption curve made from known amounts of free CPDB, the concentration of the anchoring compounds attached onto the nanoparticles can be calculated. Knowledge of the concentration of the anchoring compounds attached onto the nanoparticles before the reaction provides the reaction with control and predictability, which is the key to controlling molecular weight and molecular weight distribution.

3. Attaching a First Polymeric Chain to the First Anchoring Compound:

Two methods can be utilized to form the first polymeric chain extending from the nanoparticles via the first anchoring compound: a "grafting-from" approach and a "grafting-to" approach. These strategies will be explained in more details in the following sections.

A. "Grafting-From" Methods

In one embodiment, the first polymeric chain can be formed by polymerizing a first plurality of first monomers on the first anchoring compound, resulting in the first polymeric chain being covalently bonded to the nanoparticle via the first anchoring compound. According to this method, the polymerization of the first polymeric chain can be conducted through any suitable type of polymerization, such as RAFT polymerization, ATRP, etc., which are discussed in greater detail below.

The particular types of monomer(s) and/or polymerization technique can be selected based upon the desired polymeric chain to be formed. For example, for RAFT polymerization, monomers containing acrylate, methacrylate groups, acrylamides, styrenics, etc., are particularly suitable for formation of the first polymeric chain.

Thus, the "grafting-from" method involves formation of the first polymeric chain onto the first anchoring compound and results in the first polymeric chain being covalently bonded to the nanoparticle via the first anchoring compound (and, if present, a first functionalization compound).

B. "Grafting-To" Methods

In one embodiment, the first polymeric chain can be first polymerized and subsequently covalently bonded to the surface of the nanoparticle, either directly or via a first anchoring compound (and, if present, a first functionalization compound). Thus, in this embodiment, the first polymeric chain has been polymerized prior to attachment to the first anchoring compound.

In this embodiment, the first polymeric chain is not limited to the type of polymerization and/or types of monomer(s) capable of being polymerized directly to the first anchoring compound. As such, as long as the first polymeric chain defines a functional group that can react and bond to the first anchoring compound, any polymeric chain can be bonded to the nanoparticle.

4. Deactivating the First Polymeric Chain:

No matter the method used to attach the first polymeric chain to first anchoring compound on the nanoparticle, upon attachment, the first polymeric chain is, in one particular embodiment, deactivated to prevent further polymerization thereon.

For example, if the "grafting-from" method was utilized to attach the first polymeric chain to the first anchoring compound via polymerization through a CLP technique (e.g., RAFT), a deactivation agent can be attached to the end of each polymeric chain to inhibit further polymerization thereon. The deactivation agents can be selected based upon the type of polymerization and/or the type(s) of monomers utilized, but can generally include but are not limited to amines, peroxides, or mixtures thereof.

On the other hand, if the "grafting-to" method was utilized to attach the first polymeric chain to the first anchoring compound via attaching a pre-formed first polymeric chain, the first polymeric chain can be deactivated after covalently bonding the first polymeric chain to the first anchoring compound and prior to attaching the second anchoring compound to the nanoparticle. Alternatively, the first polymeric chain can be deactivated prior to covalently bonding the first polymeric chain to the first anchoring compound.

The deactivation of the first polymeric chain can be achieved by any suitable process. In one embodiment, the polymer chain can be cleaved. Alternatively, the end of the polymer chain can be deactivated. For example, when formed via RAFT polymerization, the types of reactions that can be used to convert RAFT agents to deactivated end groups include reactions with diazo compounds, reactions with nucleophilic reagents such as primary amines, and reactions with oxidation agents which cleave the RAFT agent off the chain end and form an oxidized sulfur group such as sulfonic acid.

5. Attaching a Second Anchoring Compound to the Nanoparticle:

After attachment and deactivation of the first polymeric chain to the nanoparticle, a second anchoring compound can be attached to the remaining surface defined on the nanoparticle. This second anchoring compound can be attached via any of the methods described above with respect to the first anchoring compound. The second anchoring compound and/or method of its attachment need not be the same as the first anchoring compound. However, in one particular embodiment, the first anchoring compound and the second anchoring compound are the same.

6. Formation of a Second Polymeric Chain Extending from the Nanoparticle:

The second polymeric chain can be attached to the second anchoring compound on the nanoparticle via the "grafting-from" method described above with respect to the first polymeric chain. The type(s) of monomers and/or polymerization technique for the formation of the second polymeric chain can be selected independently of the type of first polymeric chain already present on the nanoparticle. However, without wishing to be bound by any particular theory, it is presently believed that the use of a "grafting-to" method, which would utilize a pre-formed second polymeric chain, may not be suitable due to the limited access of such a pre-formed polymeric chain to the second anchoring agent on the surface of the nanoparticle between the first polymeric chains.

7. Additional Polymeric Chains

Additional polymeric chains (e.g., a third polymeric chain, fourth polymeric chain, etc.) can be attached to the nanoparticle as desired following the description above with respect to the attachment of the second polymeric chain.

8. Nanoparticles with Multiple Polymeric Assemblies:

According to these methods, nanoparticles with multiple polymeric assemblies can be formed that have a first polymeric chain covalently bonded to its surface via a first anchoring compound and a second polymeric chain covalently bonded to its surface via a second anchoring compound. As stated, additional polymeric chains (e.g., a third polymeric chain) can be further attached to the nanoparticles.

As used herein, the term "first polymeric chain" is meant to describe a first type of polymeric chain, and one of ordinary skill in the art would recognize that a multiple first polymeric chains could be present on the nanoparticle (i.e., a first plurality of first polymeric chains). Likewise, the term "second polymeric chain" is meant to describe a second type of polymeric chain, and one of ordinary skill in the art would recognize that a multiple second polymeric chains could be present on the nanoparticle (i.e., a second plurality of second polymeric chains). Even further, the term "third polymeric chain" is meant to describe a third type of polymeric chain, and one of ordinary skill in the art would recognize that a multiple third polymeric chains could be present on the nanoparticle (i.e., a third plurality of third polymeric chains).

As stated, the first polymeric chain can be different than the second polymeric chain (e.g., the polymeric first polymeric chain can have a different polydispersity index, molecular weight, etc. than the second polymeric chain). For instance, in one embodiment, the first polymeric chain can have a molecular weight up to 50,000 (e.g., up to 25,000, up to 10,000, or about 500 to about 50,000), and the second polymeric chain can have a molecular weight of about 50,000 or more. The use of such a relatively small molecular weight for the first polymeric chain can help ensure access to the remaining surface defined on the nanoparticle for attachment of the second anchoring compound.

In one embodiment, more first polymeric chains can be attached to the surface of the nanoparticle than second polymeric chains.

Polymerization Techniques

As stated, the first and second polymeric chains can be formed via controlled polymerizations, such as controlled living polymerizations (CLPs) or controlled ring-opening polymerizations, which may be independently selected for each of the first and second polymeric chains based upon the particular anchoring agent present on the nanoparticle, type of monomer(s) used to form the polymeric chain, and/or desired properties of the polymeric chains formed. Through the use of these controlled polymerizations, each polymeric chain can be produced with low polydispersity and diverse architectures. Thus, these methods are ideal for block polymer and/or graft polymer synthesis.

Controlled living polymerization generally refers to chain growth polymerization which proceeds with significantly suppressed termination or chain transfer steps. Thus, polymerization in CLP proceeds until all monomer units have been consumed or until the reaction is terminated (e.g., through quenching and/or deactivating), and the addition of monomer results in continued polymerization, making CLP ideal for block polymer and graft polymer synthesis. The molecular weight of the resulting polymer is generally a linear function of conversion so that the polymeric chains are initiated and grow substantially uniformly. Thus, CLPs provide precise control on molecular structures, functionality and compositions. Thus, these polymers can be tuned with desirable compositions and architectures.

Controlled living polymerizations can be used to produce block copolymers because CLP can leave a functional terminal group on the polymer formed (e.g., a halogen functional group). For example, in the copolymerization of two monomers (A and B) allowing A to polymerize via CLP will exhaust the monomer in solution with minimal termination. After monomer A is fully reacted, the addition of monomer B will result in a block copolymer. Controlled ring-opening polymerizations can utilize suitable catalysts such as tin(II) to open the rings of monomers to form a polymer.

Several of such polymerization techniques are discussed in this application. These techniques are generally known to those skilled in the art. A brief general description of each technique is below, and is provided for further understanding of the present invention, and is not intended to be limiting:

A. Reversible Addition-Fragmentation Chain Transfer Polymerization

Reversible Addition-Fragmentation chain Transfer polymerization (RAFT) is one type of controlled radical polymerization. RAFT polymerization uses thiocarbonylthio compounds, such as dithioesters, dithiocarbamates, trithiocarbonates, and xanthates, in order to mediate the polymerization via a reversible chain-transfer process. RAFT polymerization can be performed by simply adding a chosen quantity of appropriate RAFT agents (thiocarbonylthio compounds) to a conventional free radical polymerization. RAFT polymerization is particularly useful with monomers having a vinyl functional group (e.g., a (meth)acrylate group).

Typically, a RAFT polymerization system includes the monomer, an initiator, and a RAFT agent (also referred to as a chain transfer agent). Because of the low concentration of the RAFT agent in the system, the concentration of the initiator is usually lower than in conventional radical polymerization. Suitable radical initiators can be azobisisobutyronitrile (AIBN), 4,4'-azobis(4-cyanovaleric acid) (ACVA), etc.

RAFT agents are generally thiocarbonylthio compounds, such as generally shown below:

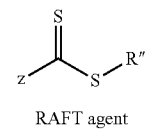

RAFT agent where the z group primarily stabilizes radical species added to the C=S bond and the R group is a good homolytic leaving group which is able to initiate monomers. For example, the z group can be an aryl group (e.g., phenyl group, benzyl group, etc.), an alkyl group, etc. The R" group can be an organic chain terminating with a carboxylic acid group.

As stated, RAFT is a type of living polymerization involving a conventional radical polymerization in the presence of a reversible chain transfer reagent. Like other living radical polymerizations, there is minimized termination step in the RAFT process. The reaction is started by radical initiators (e.g., AIBN). In this initiation step, the initiator reacts with a monomer unit to create a radical species which starts an active polymerizing chain. Then, the active chain reacts with the thiocarbonylthio compound, which kicks out the homolytic leaving group (R"). This is a reversible step, with an intermediate species capable of losing either the leaving group (R") or the active species. The leaving group radical then reacts with another monomer species, starting another active polymer chain. This active chain is then able to go through the addition-fragmentation or equilibration steps. The equilibration keeps the majority of the active propagating species into the dormant thiocarbonyl compound, limiting the possibility of chain termination. Thus, active polymer chains are in equilibrium between the active and dormant species. While one polymer chain is in the dormant stage (bound to the thiocarbonyl compound), the other is active in polymerization.

By controlling the concentration of initiator and thiocarbonylthio compound and/or the ratio of monomer to thiocarbonylthio compound, the molecular weight of the polymeric chains can be controlled with low polydispersities.

Depending on the target molecular weight of final polymers, the monomer to RAFT agent ratios can range from about less than about 10 to more than about 1000 (e.g., about 10 to about 1,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc. The reaction temperature can range from room temperature (e.g., about 20° C.) to about 120° C. The reaction time can be from less than about 1 h to about 48 h.

The RAFT process allows the synthesis of polymers with specific macromolecular architectures such as block, gradient, statistical, comb/brush, star, hyperbranched, and network copolymers.

Because RAFT polymerization is a form of living radical polymerization, it is ideal for synthesis of block copolymers. For example, in the copolymerization of two monomers (A and B) allowing A to polymerize via RAFT will exhaust the monomer in solution with significantly suppressed termination. After monomer A is fully reacted, the addition of monomer B will result in a block copolymer. One requirement for maintaining a narrow polydispersity in this type of copolymer is to have a chain transfer agent with a high transfer constant to the subsequent monomer (monomer B in the example).

Using a multifuntional RAFT agent can result in the formation of a star copolymer. RAFT differs from other forms of CLPs because the core of the copolymer can be introduced by functionalization of either the R group or the Z group. While utilizing the R group results in similar structures found using ATRP or NMP, the use of the Z group makes RAFT unique. When the Z group is used, the reactive polymeric arms are detached from the core while they grow and react back into the core for the chain-transfer reaction.

B. Atom Transfer Radical Polymerization

Atom transfer radical polymerization (ATRP) is another example of a living radical polymerization. The control is achieved through an activation-deactivation process, in which most of the reaction species are in dormant format, thus significantly reducing chain termination reaction. The four major components of ATRP include the monomer, initiator, ligand, and catalyst. ATRP is particularly useful monomers having a vinyl functional group (e.g., a (meth)acrylate group).

Organic halides are particularly suitable initiators, such as alkyl halides (e.g., alkyl bromides, alkyl chlorides, etc.). For instance, in one particular embodiment, the alkyl halide can be ethyl 2-bromoisobutyrate. The shape or structure of the initiator can also determine the architecture of the resulting polymer. For example, initiators with multiple alkyl halide groups on a single core can lead to a star-like polymer shape.

The catalyst can determine the equilibrium constant between the active and dormant species during polymerization, leading to control of the polymerization rate and the equilibrium constant. In one particular embodiment, the catalyst is a metal having two accessible oxidation states that are separated by one electron, and a reasonable affinity for halogens. One particularly suitable metal catalyst for ATRP is copper (I).

The ligands can be linear amines or pyridine-based amines.

Depending on the target molecular weight of final polymers, the monomer to initiator ratios can range from less than about 10 to more than about 1,000 (e.g., about 10 to about 1,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc. The reaction temperature can range from room temperature (e.g., about 20° C.) to about 120° C. The reaction time can be from less than about 1 h to about 48 h.

C. Nitroxide-Mediated Polymerization

Nitroxide-mediated polymerization (NMP) is another form of controlled living polymerization utilizing a nitroxide radical, such as shown below:

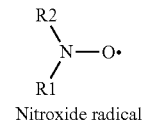

Nitroxide radical where R1 and R2 are, independently, organic groups (e.g., aryl groups such as phenyl groups, benzyl groups, etc.; alkyl groups, etc.). NMP is particularly useful with monomers having a vinyl functional group (e.g., a (meth)acrylate group).

D. Ring-Opening Metathesis Polymerization

Ring-opening metathesis polymerization (ROMP) is a type of olefin metathesis polymerization. The driving force of the reaction is relief of ring strain in cyclic olefins (e.g. norbornene or cyclopentene) in the presence of a catalyst. The catalysts used in a ROMP reaction can include a wide variety of metals and range from a simple RuCl$_3$/alcohol mixture to Grubbs' catalyst.

In this embodiment, the monomer can include a strained ring functional group, such as a norbornene functional group, a cyclopentene functional group, etc. to form the polymeric chains. For example, norbornene is a bridged cyclic hydrocarbon that has a cyclohexene ring bridged with a methylene group in the para position.

The ROMP catalytic cycle generally requires a strained cyclic structure because the driving force of the reaction is relief of ring strain. After formation of the metal-carbene species, the carbene attacks the double bond in the ring structure forming a highly strained metallacyclobutane intermediate. The ring then opens giving the beginning of the polymer: a linear chain double bonded to the metal with a terminal double bond as well. The new carbene reacts with the double bond on the next monomer, thus propagating the reaction.

E. Ring-Opening Polymerization

In one particular embodiment, where the monomer includes a strained ring function group (e.g., a caprolactone or lactide), ring-opening polymerization (ROP) may be used to form the polymeric chain. For example, a caprolcatone-substituted monomer is a polymerizable ester, which can undergo polymerization with the aid of an alcohol as an initiator and a tin-based reagent as a catalyst.

EXAMPLES

Materials

Unless otherwise specified, all chemicals were purchased from Fisher Scientific and used as received. Colloidal silica particles (15 nm diameter) were purchased from Nissan Chemical. 2,2'-Azoisobutyronitrile (AIBN) was used after recrystallization in ethanol. Styrene and methyl methacrylate were passed through a basic alumina column to remove the inhibitor before use. Activated 4-cyanopentanoic acid dithiobenzoate (CPDB) was prepared according to a procedure described in literature.[7] 3-Aminopropyldimethylethoxysilane, dimethylmethoxy-n-octylsilane and 3-trimethoxysilylpropyl-2-bromo-2-methylpropionate were purchased from Gelest Inc and used as received.

Instrumentation:

NMR spectra were recorded on a Varian 300 spectrometer using $CDCl_3$ as solvent. Molecular weights and molecular weight distributions were determined using a Waters gel-permeation chromatograph equipped with a 515 HPLC pump, 2410 refractive index detector, three Styragel columns (HR1, HR3, HR4 in the effective molecular weight range of 100-5000, 500-30000 and 5000-500000, respectively) with THF as eluent at 30° C. and a flow rate of 1.0 mL/min. The GPC system was calibrated with poly(methyl methacrylate) and polystyrene standards obtained from Polymer Labs.

1. Synthesis of CPDB Anchored Silica Nanoparticles:

A solution (10 ml) of colloidal silica particles (30 wt % in MIBK) was added to a two necked round-bottom flask and diluted with 75 ml of THF. To it was added 3-aminopropyldimethylethoxysilane (0.16 ml, 1 mmol) and the mixture was refluxed at 75° C. overnight under nitrogen protection. The reaction was then cooled to room temperature and precipitated in large amount of hexanes. The particles were then recovered by centrifugation and dispersed in THF using sonication and precipitated in hexanes again. The amino functionalized particles were then dispersed in 40 ml of THF for further reaction.

A THF solution of the amino functionalized silica nanoparticles (40 ml, 1.8 g) was added drop wise to a THF solution (30 ml) of activated CPDB (0.25 g, 0.65 mmol) at room temperature. After complete addition, the solution was stirred overnight. The reaction mixture was then precipitated into a large amount of 4:1 mixture of cyclohexane and ethyl ether (2500 ml). The particles were recovered by centrifugation at 3000 rpm for 8 minutes. The particles were then re-dispersed in 30 ml THF and precipitated in 4:1 mixture of cyclohexane and ethyl ether. This dissolution-precipitation procedure was repeated 2 more times until the supernatant layer after centrifugation was colorless. The red CPDB anchored silica nanoparticles were dried at room temperature and analyzed using UV analysis for the chain density.

Several such CPDB anchored silica nanoparticles having different grafting density from 0.05 to 0.6 were prepared by adjusting the ratio of the 3-aminopropyldimethylethoxysilane to colloidal silica nanoparticles.

2. Synthesis of Bimodal Silica Grafted Polymethylmethacrylate (PMMA) Nanoparticles by Step-by-Step RAFT Polymerization:

A. Graft Polymerization of Methyl Methacrylate Monomer from CPDB Anchored Colloidal Silica Nanoparticles to Graft $1^{st}$ Chain from Surface of Nanoparticles:

A solution of methyl methacrylate (7 mL), CPDB anchored silica nanoparticles (300 mg, 80 µmol/g), AIBN (2.40 µmol), and THF (7 mL) was prepared in a dried Schlenk tube. The mixture was degassed by three freeze-pump-thaw cycles, back filled with nitrogen, and then placed in an oil bath at 60° C. for 3 h. The polymerization solution was quenched in ice water and poured into cold methanol to precipitate polymer grafted silica nanoparticles. The polymer chains were cleaved by treating a small amount of nanoparticles with HF and the resulting polymer chains were analyzed by GPC. The polymer cleaved from the Si-g-PMMA particles had a molecular weight of 24400 g/mol and PDI of 1.07.

B. Cleavage of RAFT Agent from $1^{st}$ Brush:

Solid AIBN (24 µmol) was added to a solution of Si-g-PMMA in THF (0.4 g in 20 ml) and heated at 65° C. under nitrogen for 30 minutes. The resulting white solution mixture was poured into 100 ml hexanes and centrifuged at 8000 rpm for 5 minutes to recover Si-g-PMMA nanoparticles.

C. Functionalization of Si-g-PMMA by $2^{nd}$ RAFT Agent:

The second RAFT agent was attached onto the surface of the silica which was not covered by the first polymer chain. The bare surface of the nanoparticles was functionalized by amine groups using 0.01 ml of 3-aminopropyldimethylethoxysilane in a process similar to the first RAFT agent attachment. The second RAFT agent was attached by reaction 30 mg of activated CPDB (0.030 g) at room temperature with the amino-functional particles.

D. Graft Polymerization of Methyl Methacrylate from Si-g-PMMA to Synthesize $2^{nd}$ brush:

The CPDB anchored Si-g-PMMA particles (0.4 g) dissolved in 10 mL THF were added to a dried Schlenk tube along with 15 ml MMA and AIBN (45 µl of 0.005M THF solution). The mixture was degassed by three freeze-pump-thaw cycles, back filled with nitrogen, and then placed in an oil bath at 65° C. for 12 hours. The polymerization was quenched in ice water. The polymer was recovered by precipitating into hexane and centrifugation at 8000 rpm. GPC results indicated the $2^{nd}$ chain has a molecular weight of 103000 g/mol and PDI of 1.13.

3. Synthesis of Bimodal Silica Grafted Polystyrene (PS) Nanoparticles by Step-by-Step RAFT Polymerization A. Graft Polymerization of Styrene from CPDB Anchored Colloidal Silica Nanoparticles to Graft $1^{st}$ Chain from Surface of Nanoparticles:

A solution of styrene (25 mL), CPDB anchored silica nanoparticles (1.4 g, 80 µmol/g), AIBN (1.8 ml, 5 mM solution in THF), and THF (25 mL) was prepared in a dried Schlenk tube. The mixture was degassed by three freeze-pump-thaw cycles, back filled with nitrogen, and then placed in an oil bath at 65° C. for 4 hours. The polymerization solution was quenched in ice water and poured into cold methanol to precipitate polymer grafted silica nanoparticles. The polymer chains were cleaved by treating a small amount of nanoparticles with HF and the resulting polymer chains were analyzed by GPC. The polymer cleaved from the Si-g-PS particles had a molecular weight of 1600 g/mol and PDI of 1.26.

B. Cleavage of RAFT Agent from $1^{st}$ Brush:

Solid AIBN (250 mg) was added to a solution of Si-g-PS in THF (2 g in 50 ml) and heated at 65° C. under nitrogen for 30 minutes. The resulting white solution mixture was poured into 200 ml hexanes and centrifuged at 8000 rpm for 5 minutes to recover Si-g-PS nanoparticles.

C. Functionalization of Si-g-PS by $2^{nd}$ RAFT Agent:

The second RAFT agent was attached onto the surface of the silica which was not covered by the first polymer chain. The bare surface of the nanoparticles was functionalized by amine groups using 0.01 ml of 3-aminopropyldimethylethoxysilane in a process similar to the first RAFT agent attachment. The second RAFT agent was attached by reaction 30 mg of activated CPDB (0.030 g) at room temperature with the amino-functional particles.

D. Graft Polymerization of Styrene from Si-g-PS to Synthesize $2^{nd}$ Brush:

The CPDB anchored Si-g-PS particles (1.4 g by weight of bare silica) dissolved in 10 mL THF were added to a dried Schlenk tube along with 20 ml styrene and AIBN (1.8 mL of 0.005M THF solution). The mixture was degassed by three freeze-pump-thaw cycles, back filled with nitrogen, and then placed in an oil bath at 65° C. for 18 hours. The polymerization was quenched in ice water. The polymer was recovered by precipitating into hexane and centrifugation at 8000 rpm. GPC results indicated the $2^{nd}$ chain has a molecular weight of 40,000 g/mol and PDI of 1.19.

4. Synthesis of Mixed Brush of Polystyrene and Polymethylmethacrylate (PMMA) Grafted Silica Nanoparticles by Step-by-Step RAFT Polymerization A. Graft Polymerization of Styrene from CPDB Anchored Colloidal Silica Nanoparticles to Graft $1^{st}$ Chain from Surface of Nanoparticles:

A solution of styrene (10 mL), CPDB anchored silica nanoparticles (0.5 g, 80 μmol/g), AIBN (0.600 ml, 5 mM solution in THF), and THF (10 mL) was prepared in a dried Schlenk tube. The mixture was degassed by three freeze-pump-thaw cycles, back filled with nitrogen, and then placed in an oil bath at 65° C. for 4 hours. The polymerization solution was quenched in ice water and poured into cold methanol to precipitate polymer grafted silica nanoparticles. The polymer chains were cleaved by treating a small amount of nanoparticles with HF and the resulting polymer chains were analyzed by GPC. The polymer cleaved from the Si-g-PS particles had a molecular weight of 5000 g/mol and PDI of 1.13.

B. Cleavage of RAFT Agent from $1^{st}$ Brush:

Solid AIBN (108 mg) was added to a solution of Si-g-PS in THF (0.5 g in 50 ml) and heated at 65° C. under nitrogen for 30 minutes. The resulting white solution mixture was poured into 200 ml hexanes and centrifuged at 8000 rpm for 5 minutes to recover Si-g-PS nanoparticles.

C. Functionalization of Si-g-PS by $2^{nd}$ RAFT Agent:

The second RAFT agent was attached onto the surface of the silica which was not covered by the first polymer chain. The bare surface of the nanoparticles was functionalized by amine groups using 0.0025 ml of 3-aminopropyldimethylethoxysilane in a process similar to the first RAFT agent attachment. The second RAFT agent was attached by reaction 30 mg of activated CPDB (0.030 g) at room temperature with the amino-functional particles.

D. Graft Polymerization of Methyl Methacrylate from Si-g-PS to Synthesize $2^{nd}$ Brush:

The CPDB anchored Si-g-PS particles (0.5 g by weight of bare silica) dissolved in 10 mL THF were added to a dried Schlenk tube along with 20 ml styrene and AIBN (0.01 ml of 0.005M THF solution). The mixture was degassed by three freeze-pump-thaw cycles, back filled with nitrogen, and then placed in an oil bath at 60° C. for 14 hours. The polymerization was quenched in ice water. The polymer was recovered by precipitating into hexane and centrifugation at 8000 rpm. GPC results indicated the $2^{nd}$ chain has a molecular weight of 205,000 g/mol and PDI of 1.17.

5. Synthesis of Mixed Brush of Polymethyl Methacrylate and Poly(t-Butyl Methacrylate) Grafted Silica Nanoparticles by Step-by-Step RAFT Polymerization A. Graft Polymerization of Methyl Methacrylate from CPDB Anchored Colloidal Silica Nanoparticles to Graft $1^{st}$ Chain from Surface of Nanoparticles:

A solution of methyl methacrylate (10 mL), CPDB anchored silica nanoparticles (0.5 g, 80 μmol/g), AIBN (0.600 ml, 5 mM solution in THF), and THF (10 mL) was prepared in a dried Schlenk tube. The mixture was degassed by three freeze-pump-thaw cycles, back filled with nitrogen, and then placed in an oil bath at 60° C. for 3 hours. The polymerization solution was quenched in ice water and poured into cold methanol to precipitate polymer grafted silica nanoparticles. The polymer chains were cleaved by treating a small amount of nanoparticles with HF and the resulting polymer chains were analyzed by GPC. The polymer cleaved from the Si-g-PMMA particles had a molecular weight of 5000 g/mol and PDI of 1.17.

B. Cleavage of RAFT Agent from $1^{st}$ Brush:

Solid AIBN (108 mg) was added to a solution of Si-g-PMMA in THF (0.5 g in 50 ml) and heated at 65° C. under nitrogen for 30 minutes. The resulting white solution mixture was poured into 100 ml hexanes and centrifuged at 8000 rpm for 5 minutes to recover Si-g-PMMA nanoparticles.

C. Functionalization of Si-g-PS by $2^{nd}$ RAFT Agent:

The second RAFT agent was attached onto the surface of the silica which was not covered by the first polymer chain. The bare surface of the nanoparticles was functionalized by amine groups using 0.0025 ml of 3-aminopropyldimethylethoxysilane in a process similar to the first RAFT agent attachment. The second RAFT agent was attached by reaction 30 mg of activated CPDB (0.030 g) at room temperature with the amino-functional particles.

D. Graft Polymerization of t-Butyl Methacrylate from Si-g-PMMA to Synthesize $2^{nd}$ Brush:

The CPDB anchored Si-g-PMMA particles (0.105 g) dissolved in 7 mL THF were added to a dried Schlenk tube along with 0.500 ml t-butyl methacrylate and AIBN (10 μl of 0.005M THF solution). The mixture was degassed by three freeze-pump-thaw cycles, back filled with nitrogen, and then placed in an oil bath at 65° C. for 12 hours. The polymerization was quenched in ice water. The polymer was recovered by precipitating into hexane and centrifugation at 8000 rpm. GPC results indicated the $2^{nd}$ chain has a molecular weight of 17000 g/mol and PDI of 1.24.

6. Synthesis of Bimodal Polystyrene Brush Grafted Silica Nanoparticles by Step-by-Step RAFT and ATRP Polymerization A. Graft Polymerization of Styrene from CPDB Anchored Colloidal Silica Nanoparticles to Graft $1^{st}$ Chain from Surface of Nanoparticles:

A solution of methyl methacrylate (10 mL), CPDB anchored silica nanoparticles (0.3 g, 80 μmol/g), AIBN (0.240 ml, 5 mM solution in THF), and THF (10 mL) was prepared in a dried Schlenk tube. The mixture was degassed by three freeze-pump-thaw cycles, back filled with nitrogen, and then placed in an oil bath at 65° C. for 4 hours. The polymerization solution was quenched in ice water and poured into cold methanol to precipitate polymer grafted silica nanoparticles. The polymer chains were cleaved by treating a small amount of nanoparticles with HF and the resulting polymer chains were analyzed by GPC. The polymer cleaved from the Si-g-PMMA particles had a molecular weight of 10400 g/mol and PDI of 1.12.

B. Cleavage of RAFT Agent from $1^{st}$ Brush:

Solid AIBN (110 mg) was added to a solution of Si-g-PS in THF (0.5 g in 50 ml) and heated at 65° C. under nitrogen for 30 minutes. The resulting white solution mixture was poured into 100 ml hexanes and centrifuged at 8000 rpm for 5 minutes to recover Si-g-PS nanoparticles.

C. Functionalization of Si-g-PS by ATRP Initiator Agent:

The ATRP initiator was attached onto the surface of the silica which was not covered by the first polymer chain. A solution (0.3 g by weight of silica) of Si-g-PS was added to a two necked round-bottom flask and diluted with 25 ml of THF. To it was added 0.025 ml of 3-trimethoxysilylpropyl- 2-bromo-2-methylpropionate and the mixture was refluxed at 75° C. overnight under nitrogen protection. The reaction was then cooled to room temperature and precipitated in large amount of hexanes. The particles were then recovered by centrifugation and dispersed in THF using sonication and precipitated in hexanes again. The ATRP initiator functionalized particles were then dispersed in 10 ml of THF for further reaction.

D. ATRP Polymerization of Styrene from Si-g-PS to Synthesize $2^{nd}$ PS Brush:

The styrene monomer (10 ml), Cu(I)Cl (0.189 mmol) and $Me_6$Tren ligand (0.38 mmol) was added to a Schlenk flask and degassed by purging nitrogen for 10 minutes. In another flask ATRP initiator anchored Si-g-PS particles (0.3 g by weight of silica) were dissolved in 10 mL THF and the solution was degassed using nitrogen for 10 minutes. The nanoparticle solution was then added to the Schlenk flask and the Schlenk flask was then placed in an oil bath at 90° C. for 36 hours. The polymerization was quenched in ice water. The polymer was recovered by precipitating into methanol and centrifugation at 8000 rpm, followed by redispersion in THF. The process was repeated 4 more times to remove the copper catalyst. GPC results indicated the $2^{nd}$ chain has a molecular weight of 255000 g/mol and PDI of 1.43.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of synthesizing a binary polymer functionalized nanoparticle, the method comprising:
    attaching a first polymeric chain to the nanoparticle, wherein the first polymeric chain has been polymerized prior to attachment to the nanoparticle;
    thereafter, attaching a second anchoring compound to the nanoparticle;
    polymerizing a second plurality of second monomers on the second anchoring compound to form a second polymeric chain covalently bonded to the nanoparticle via the second anchoring compound.

2. The method as in claim 1, wherein the first polymeric chain is covalently bonded directly to the nanoparticle.

3. The method as in claim 1, further comprising:
    prior to attachment of the first polymeric chain, attaching a first anchoring compound to a nanoparticle, such that the first polymeric chain is attached to the nanoparticle via the first anchoring compound.

4. The method as in claim 1, further comprising:
    deactivating the first polymeric chain after attaching the first polymeric chain to the nanoparticle and prior to attaching the second anchoring compound to the nanoparticle.

5. The method as in claim 1, wherein the first polymeric chain is deactivated prior to attaching the first polymeric chain to the nanoparticle.

6. The method as in claim 1, further comprising:
    deactivating the second polymeric chain.

7. The method as in claim 1, wherein the first polymeric chain is different than the second polymeric chain.

8. The method as in claim 7, wherein the first polymeric chain has a molecular weight up to about 50,000, and wherein the second polymeric chain has a molecular weight of about 50,000 or more.

9. The method as in claim 7, wherein the polymeric first polymeric chain has a different polydispersity index than the second polymeric chain.

10. The method as in claim 1, wherein the first plurality of first monomers comprises a single type of monomer.

11. The method as in claim 1, wherein the first plurality of first monomers comprises a mixture of different types of monomers.

12. The method as in claim 1, wherein the second plurality of second monomers comprises a single type of monomer.

13. The method as in claim 1, wherein the second plurality of second monomers comprises a mixture of different types of monomers.

14. The method as in claim 1, further comprising:
    after polymerizing a second plurality of second monomers, attaching a third anchoring compound to the nanoparticle; and
    polymerizing a third plurality of third monomers on the third anchoring compound to form a third polymeric chain covalently bonded to the nanoparticle via the third anchoring compound.

15. The method as in claim 14, further comprising:
    deactivating the third polymeric chain.

16. The method as in claim 14, further comprising:
    after polymerizing the third plurality of third monomers, attaching a fourth anchoring compound to the nanoparticle; and
    polymerizing a fourth plurality of fourth monomers on the fourth anchoring compound to form a fourth polymeric chain covalently bonded to the nanoparticle via the fourth anchoring compound.

* * * * *